United States Patent [19]
Veltman

[11] Patent Number: 5,458,261
[45] Date of Patent: Oct. 17, 1995

[54] STERILIZER WITH REDUCED SURFACE CONTAMINATION

[76] Inventor: Joost Veltman, 1654 Calypso Dr., Aptos, Calif. 95003

[21] Appl. No.: 296,999

[22] Filed: Aug. 26, 1994

Related U.S. Application Data

[63] Continuation of Ser. No. 34,944, Mar. 19, 1993, abandoned.
[51] Int. Cl.⁶ .................................................. A24F 27/14
[52] U.S. Cl. ........................ 221/150 A; 99/361; 99/366
[58] Field of Search ............................ 221/76, 150 A, 221/150 R, 277; 99/361, 366, 360, 367, 371, 340; 277/DIG. 6, 227

[56] References Cited

U.S. PATENT DOCUMENTS

| | | | |
|---|---|---|---|
| 2,468,794 | 5/1949 | Wilbur | 99/366 |
| 3,528,827 | 9/1970 | Leslie | 99/366 |
| 4,226,429 | 10/1980 | Sato et al. | 277/DIG. 6 |
| 5,234,048 | 8/1993 | Seike et al. | 277/DIG. 6 |
| 5,251,912 | 10/1993 | Rinne | 277/DIG. 6 |

Primary Examiner—Kenneth Noland
Attorney, Agent, or Firm—Michael Lee; D. W. Rudy

[57] ABSTRACT

The invention provides a transfer valve for a sterilizer/cooker, which is almost lubeless, or is lubeless. Packing strips and packing rings are provided, which are made of high temperature thermo plastics compounded with internal lubricants, such as Teflon or silicon, and graphite.

10 Claims, 3 Drawing Sheets

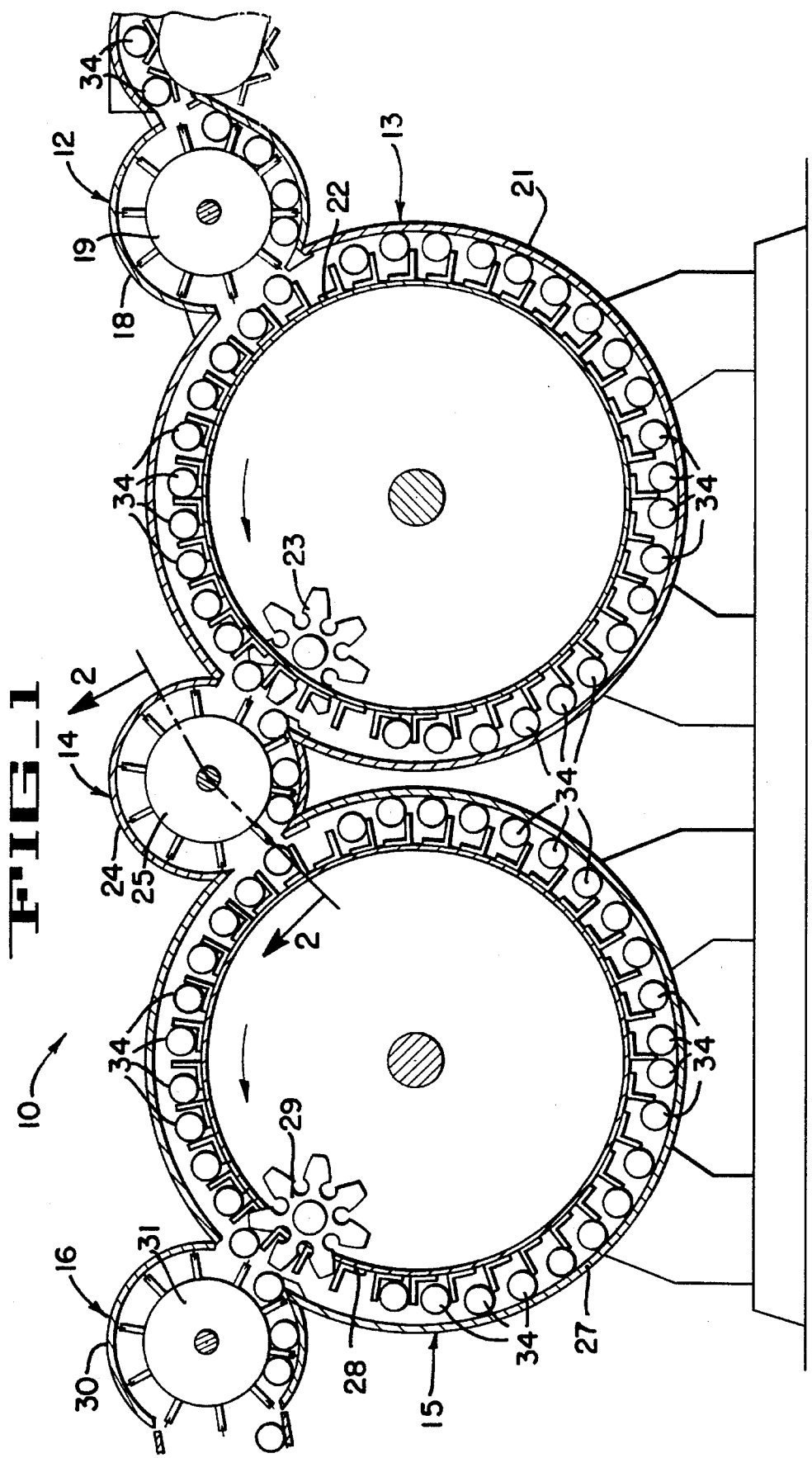
FIG_1

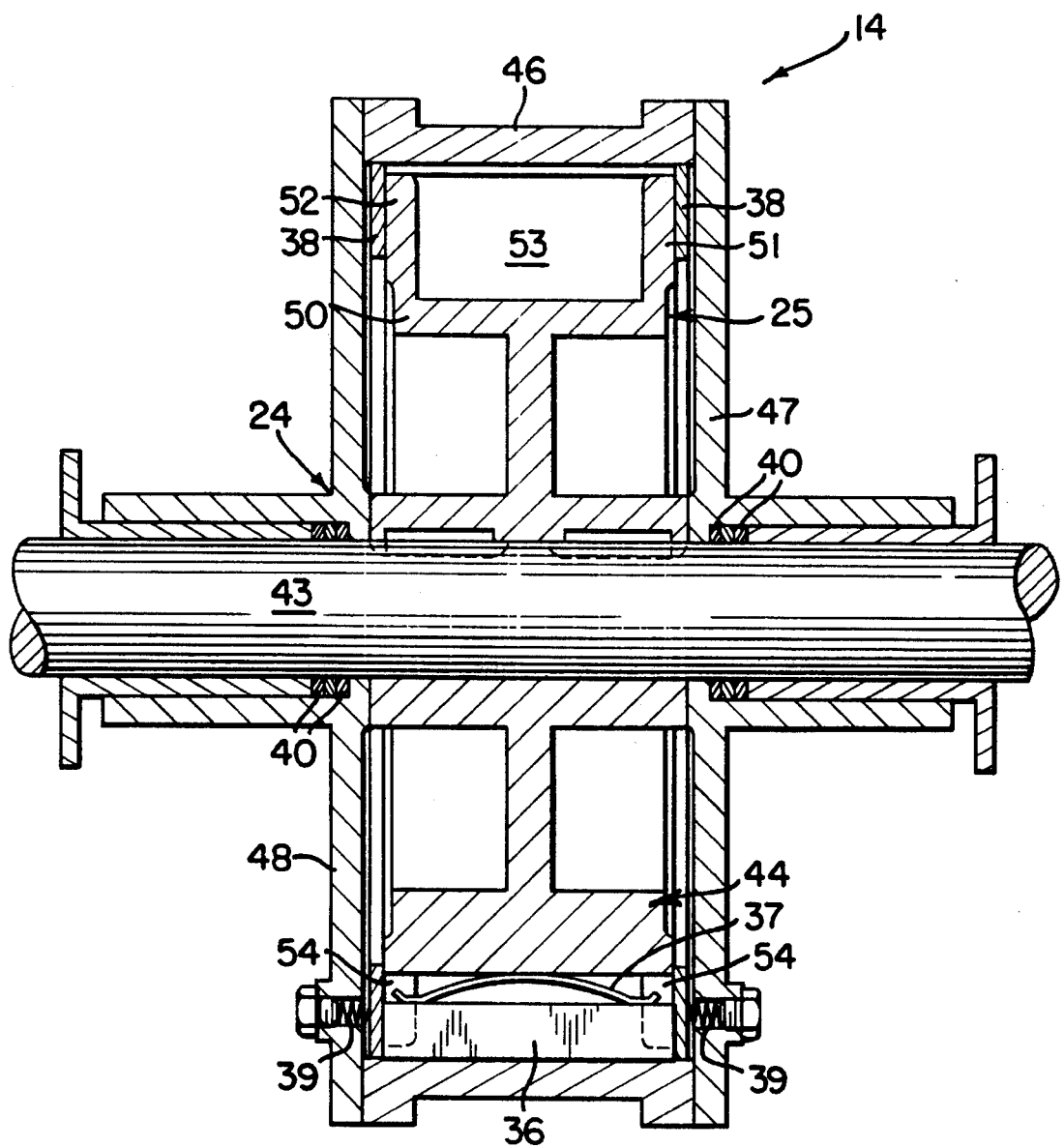

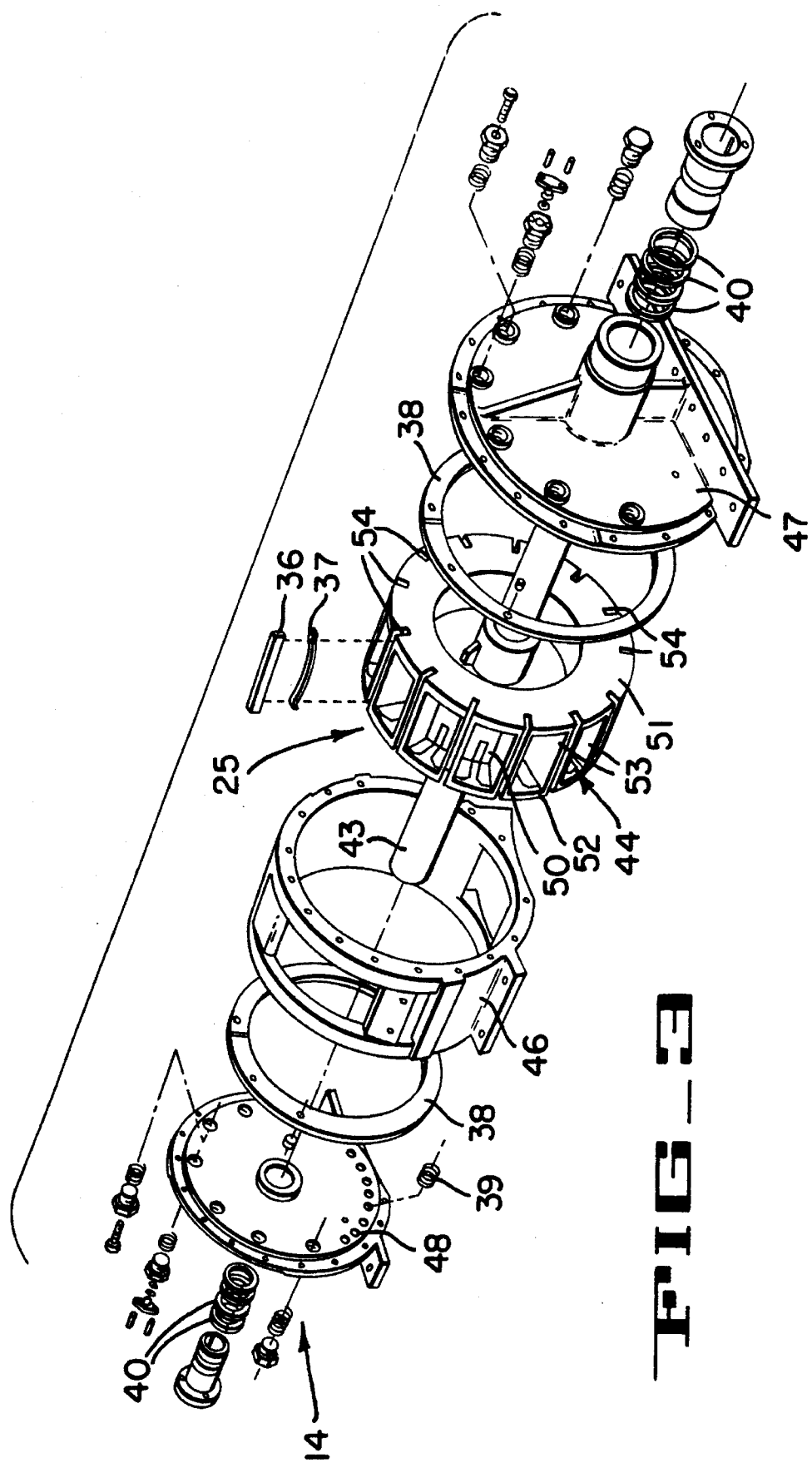

५,४५८,२६१

STERILIZER WITH REDUCED SURFACE CONTAMINATION

This application is a continuation of application Ser. No. 08/034,944, filed Mar. 19, 1993 now abandoned.

In continuous, rotary pressure sterilizers for contaminated foods, at least one vessel (or shell) is used for heating filled containers and a separate vessel is used for cooling the filled containers, such as cans, plastic containers, lithographed containers and glass containers. Lubricants used in the sterilizers find there way into the shell interior and cause surface contamination and discoloration of the containers. Especially plastic and lithographed containers are visibly coated.

It is an object of the invention to provide a sterilizer, which utilizes less or no lubricants, therefore providing a sterilizer with less contaminants. The wear components must be suitable for the steam and water environment.

The invention provides a sterilizer with lubeless or almost lubeless joints.

FIG. 1 is a transverse section of a rotary sterilizer cooker system.

FIG. 2 is a cross section of the rotary vessel transfer valve of the rotary sterilizer cooker system taken along line 2—2 of FIG. 1.

FIG. 3 is an exploded view of the rotary vessel transfer valve of the rotary sterilizer cooker system of FIG. 1.

FIG. 1 is a section of a rotary sterilizer cooker system 10, which comprises an infeed rotary valve 12, a rotary sterilizer cooker 13, a rotary vessel transfer valve 14, a rotary cooler 15, and a discharge rotary valve 16. The infeed rotary valve 12, comprises an infeed rotary valve housing 18 and an infeed rotary valve rotor 19. The rotary sterilizer cooker 13, comprises a rotary sterilizer cooker vessel 21, a rotary sterilizer cooker reel 22, and a rotary sterilizer cooker ejector 23. The rotary vessel transfer valve 14, comprises a rotary vessel transfer valve housing 24 and a rotary vessel transfer valve rotor 25. The rotary cooler 15, comprises a rotary cooler vessel 27, a rotary cooler reel 28 and a rotary cooler ejector 29. The discharge rotary valve 16, comprises a discharge rotary valve housing 30 and a discharge rotary valve rotor 31.

Cans or other containers 34, which will be described throughout the specification as cans, are feed to the infeed valve 12. The infeed rotary valve rotor 19 moves the cans to an opening in the rotary sterilizer cooker vessel 21, where the cans enter the rotary sterilizer cooker vessel 21, being fed to the rotary sterilizer cooker reel 22. The rotary sterilizer cooker reel 22 rotates, moving the cans around the inside of the rotary sterilizer cooker vessel 21. The cans 34 eventually reach the rotary sterilizer cooker ejector 23, which pushes the cans into the rotary vessel transfer valve rotor 25. The rotary vessel transfer valve rotor 25 moves the cans to an opening in the rotary cooler vessel 27, where the cans enter the rotary cooler vessel 27, being fed to the rotary cooler reel 28. The rotary cooler reel 28 rotates, as shown by the arrow, moving the cans around the inside of the rotary cooler vessel 27. The cans 34 eventually reach the rotary cooler ejector 29, which pushes the cans into the discharge rotary valve rotor 31.

FIG. 2 is a cross sectional view of the rotary vessel transfer valve 14. FIG. 3 is an exploded view of the rotary vessel transfer valve 14 As shown in FIG. 2, the rotary vessel transfer valve 14, comprises a rotary vessel transfer valve housing 24, a rotary vessel transfer valve rotor 25, a plurality of rotary vessel transfer valve packing strips 36, a plurality of rotary vessel transfer valve strip springs 37, plurality of rotary vessel transfer valve packing rings 38, a plurality of rotary vessel transfer valve pressure springs 39, and a rotary vessel transfer valve shaft packing 40.

The rotary vessel transfer valve housing 24, comprises an outer housing tube 46 and a first side plate 47 and a second side plate 48. The rotor of the transfer valve comprises a shaft 43 and a reel 44 surrounding the shaft 43 as shown. The reel 44 comprises an inner reel tube 50 mechanically connected to the shaft 43, a first reel side wall 51 mechanically connected to a first side of the inner reel tube 50, a second reel side wall 52 mechanically connected to a second side of the inner reel tube 50, and a plurality of cross walls 53 extending along the inner reel tube 50 from the first reel side wall 51 to the second reel side wall 52. Each cross wall 53 has an inner side mechanically connected to the inner reel tube 50 and an outer side furthest from the shaft inner reel tube 50. The outer side of each cross wall 53 has a groove 54. A rotary vessel transfer valve strip spring 37 is inserted into each groove 54. A rotary vessel transfer valve packing strip 36 is inserted into each groove 54 so that the rotary transfer valve strip spring 37 is between the rotary transfer valve packing strip 36 and the cross wall 53. The rotary vessel transfer valve packing strips 36 are made of Ultem 4000. Rotary vessel transfer valve packing rings 38 are placed around the circumference of the rotary vessel transfer valve housing 24 is adjacent to the rotary vessel transfer valve packing strips 36. Rotary vessel transfer valve pressure springs 39 are placed around the circumference of the rotary vessel transfer valve housing 24 adjacent to the rotary vessel transfer valve packing rings 38 to press the rotary vessel transfer valve packing rings 38 against the rotary vessel transfer valve packing strips 36. Rotary vessel transfer valve shaft packings 40 are placed in the rotary vessel transfer valve housing 24 adjacent to the shaft 43. The shaft 43 passes through the rotary vessel transfer valve shaft packings 40 and through the first side plate 47 and the second side plate 48, which allow the shaft 43 to rotate.

In operation, the reel 44 rotates with the shaft 43, as the cross walls 53 push the cans 34. The cross walls 53, first reel side wall 51, second reel side wall 52, rotary vessel transfer valve packing strips 36, rotary vessel transfer valve packing rings 38, and the outer housing tube 46 form pressure tight chambers. To maintain the pressure difference between the rotary sterilizer cooker vessel 21 and the rotary cooler vessel 27 and to reduce friction without lubrication, the rotary vessel transfer valve packing strips 36 are provided. To keep the packing strips in constant contact with the outer housing tube 46 the rotary vessel transfer valve strip springs 37 are provided. The rotary vessel transfer valve shaft packing 40 prevents pressure from escaping along the shaft 43.

Rotary transfer vessel packing strips are made of selected high temperature thermoplastics compounded with internal lubricants, such as Teflon or silicon, and graphite, which may graphite powder or graphite fiber, added to improve dimensional stability to limit water absorption having a coefficient of thermal expansion of less than $2 \times 10^{-5}$ in/in/deg F°. In the preferred embodiment Ultem 4000, which is a polyetherimide (PEI) compounded with Teflon and graphite manufactured by GE, is used for the packing strips for the infeed valve 12, the rotary vessel transfer valve 14, and the discharge rotary valve 16. Other high temperature thermo plastic materials can be compounded with internal lubricants and graphite for similar properties.

The rotary vessel transfer valve packings rings 38 are made of virgin Teflon (PTFE) stabilized with graphite in the preferred embodiment. The rotary vessel transfer valve packing rings may be made of other high temperature thermo plastics compounded with internal lubricants and graphite. The rotary vessel transfer valve packing rings 38 need a low coefficient of thermal expansion and reduce the wear of the packing strips.

The use of Ultem 4000 packing strips allows the elimination of the need to apply lubricants to the areas inside the housing where the is rubbing between the packing strips and the housing. This elimination of the application of lubricants reduces surface contaminants on the cans. The use of Ultem 4000 is not obvious since Ultem 4000 is very brittle.

In the specification and claims the term "rotary transfer valve" includes infeed valves, rotary vessel transfer valves, and discharge rotary valves.

Items may be mechanically connected by welding or brads or other fastening methods.

While preferred embodiment of the present invention has been shown and described herein, it will be appreciated that various changes and modifications may be made therein without departing from the spirit of the invention as defined by the scope of the appended claims.

What is claimed is:

1. A rotary transfer valve, comprising a housing defining a cavity;

shaft within the cavity;

a reel within the cavity and connected to the shaft in a manner that allows the reel to rotate within the housing;

a plurality of sealing strips disposed between the reel and the housing, wherein the sealing strips are made of a material of a high temperature thermoplastic compounded with an internal lubricant; and a plurality of springs wherein each spring is between the reel and a sealing strip for pressing the sealing strip against the housing.

2. A rotary transfer valve, as claimed in claim 1, wherein the sealing strips are made of a polyetherimide compounded with graphite material.

3. A rotary transfer valve, as claimed in claim 1, wherein the sealing strips are made of Ultem 4000.

4. A rotary transfer valve, as claimed in claim 3, further comprising, a first port in the housing exposed to a high temperature and high pressure region.

5. A rotary transfer valve, as claimed in claim 1, wherein the reel, comprises:

an inner reel tube mechanically connected to the shaft;

a first reel side wall mechanically connected to a first side of the inner reel tube;

a second reel side wall mechanically connected to a second side of the inner reel tube; and a plurality of cross walls extending along the inner reel tube from the first reel side wall to the second reel side wall, wherein each cross wall has an inner side mechanically connected to the inner reel tube and an outer side furthest from the inner reel tube, wherein the outer side has a groove, and wherein a spring and a sealing strip are placed in the groove, and wherein as the reel is rotated, the sealing strips trace out a path within the housing, and wherein the sealing strips are further compounded with graphite.

6. A rotary transfer valve, as claimed in claim 5, further comprising, a packing ring placed adjacent to the housing along the path traced out by the sealing strips, wherein the packing ring is made of a high temperature thermoplastic compounded with an internal lubricant.

7. A rotary transfer valve, as claimed in claim 6, wherein the internal lubricant for the sealing strips and the packing ring is Teflon.

8. A rotary transfer valve, as claimed in claim 6, wherein the internal lubricant for the sealing strips is Teflon.

9. A rotary transfer valve, as claimed in claim 6, wherein the internal lubricant is silicone.

10. A rotary transfer valve, as claimed in claim 5, wherein the internal lubricant is Teflon.

* * * * *